US012107696B2

(12) United States Patent
Decrop et al.

(10) Patent No.: US 12,107,696 B2
(45) Date of Patent: Oct. 1, 2024

(54) VIRTUAL SYSTEM FOR MERGING AND SPLITTING VIRTUAL MEETINGS

(71) Applicant: International Business Machines Corporation, Armonk, NY (US)

(72) Inventors: Clement Decrop, Arlington, VA (US); Tushar Agrawal, West Fargo, ND (US); Jeremy R. Fox, Georgetown, TX (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 20 days.

(21) Appl. No.: 17/362,447

(22) Filed: Jun. 29, 2021

(65) Prior Publication Data

US 2022/0417049 A1 Dec. 29, 2022

(51) Int. Cl.
*H04L 12/18* (2006.01)
*G06T 19/00* (2011.01)

(52) U.S. Cl.
CPC ........ *H04L 12/1822* (2013.01); *G06T 19/006* (2013.01); *H04L 12/1818* (2013.01); *H04L 12/1831* (2013.01)

(58) Field of Classification Search
CPC ............. H04L 12/1822; H04L 12/1818; H04L 12/1831; G06T 19/006
See application file for complete search history.

(56) References Cited

U.S. PATENT DOCUMENTS 5,999,208 A 12/1999 McNerney
7,716,284 B2 5/2010 Andersen
7,840,668 B1 * 11/2010 Sylvain ................ H04L 67/131 709/224
8,140,982 B2 3/2012 Hamilton, II
8,275,106 B1 9/2012 Runcie
8,300,557 B2 * 10/2012 Sekaran .............. H04L 12/1822 370/260
8,645,467 B2 * 2/2014 Chou .................. H04L 65/1069 709/204
8,739,046 B2 * 5/2014 Sloyer .................... G06Q 10/10 709/204

(Continued)

OTHER PUBLICATIONS

ANonymous. “Best apps for VR meetings 2021.” Printed Apr. 22, 2021. 13 pages. Published by XR 4 Work. https://www.xr4work.com/collections/best-apps-for-vr-meetings-2021.

(Continued)

*Primary Examiner* — Nazia Naoreen
(74) *Attorney, Agent, or Firm* — Daniel Yeates; Andrew D. Wright; Calderon Safran & Wright P.C.

(57) ABSTRACT

A processor may enhance user experience in a virtual reality (VR) meeting. A processor may generate a first VR environment of the VR meeting having a plurality of users. In embodiments, the plurality of users may opt into the VR meeting. A processor may analyze meeting activity collected from one or more data collection devices. In embodiments, the meeting activity may be associated with the plurality of users. A processor may identify a meeting modifier in the meeting activity. A processor may alter, responsive to identifying a meeting modifier in the meeting activity, the first VR environment of the VR meeting to generate a second VR environment.

20 Claims, 5 Drawing Sheets

200

Start

Generating a first VR environment of the VR meeting having a plurality of users 202

Analyzing meeting activity collected from one or more data collection devices 204

Identifying a meeting modifier in the meeting activity 206

Altering the first VR environment of the VR meeting to generate a second VR environment 208

End

(56) References Cited

U.S. PATENT DOCUMENTS

| | | | | |
|---|---|---|---|---|
| 9,305,465 | B2 * | 4/2016 | Hyndman | G09B 19/00 |
| 9,454,842 | B2 | 9/2016 | Belmans | |
| 9,742,830 | B2 | 8/2017 | Thapa | |
| 10,505,998 | B1 * | 12/2019 | Ackerman | H04L 65/4015 |
| 11,190,559 | B1 * | 11/2021 | Narayanaswamy | H04L 65/1063 |
| 11,265,181 | B1 * | 3/2022 | Springer | H04N 21/4318 |
| 11,444,989 | B1 * | 9/2022 | Han | H04L 65/4015 |
| 2007/0299710 | A1 * | 12/2007 | Haveliwala | G06Q 10/10 705/7.19 |
| 2009/0106670 | A1 * | 4/2009 | Berndt | H04L 12/1822 715/757 |
| 2014/0267550 | A1 | 9/2014 | Nimri | |
| 2015/0193979 | A1 | 7/2015 | Grek | |
| 2020/0382618 | A1 * | 12/2020 | Faulkner | H04L 67/36 |
| 2022/0021551 | A1 * | 1/2022 | Trim | H04L 12/1818 |
| 2022/0147225 | A1 * | 5/2022 | Freisthler | H04L 51/046 |

OTHER PUBLICATIONS

Anonymous. "Business Collaboration Solutions." Printed Apr. 22, 2021. 22 pages. Published by Cisco. https://www.cisco.com/c/en/us/solutions/collaboration/index.html.

Anonymous. "HexaFair virtual events & Hybrid events platform features." Printed Apr. 22, 2021. 20 pages. Published by Hexafair. https://www.hexafair.com/features/.

Anonymous. "MeetinVR. Business meetings better than in real life." Printed Apr. 22, 2021. 4 pages. Published by MeetinVR. https://www.meetinvr.com/.

Anonymous. "Roomkey." Printed Apr. 22, 2021. 3 pages. Published by Roomkey. https://www.roomkey.co/about.

Anonymous. "UX Patterns." Printed May 13, 2021. 3 pages. Published by IBM. http://ibm-design-language.eu-de.mybluemix.net/design/language/experience/vrar/ux-patterns/.

Anonymous. "Virtual Reality (VR) Market Size, Share & COVID-19 Impact Analysis, by Component (Hardware, Software, and Content), by Device Type (Head Mounted Display, VR Simulator, VR Glasses, Treadmills & Haptic Gloves, and Others), by Industry (Gaming, Entertainment, Automotive, Retail, Healthcare, Education, Aerospace & Defence, Manufacturing, and Others), and Regional Forecast, 2020-2027." Printed Apr. 22, 2021. 8 pages. Published by Fortune Business Insights. https://www.fortunebusinessinsights.com/industry-reports/virtual-reality-market-101378.

Anonymous. "Virtual Reality Market worth $20.9 billion by 2025." Printed Apr. 22, 2021. 7 pages. Published by Markets and Markets. https://www.marketsandmarkets.com/PressReleases/ar-market.asp.

Anonymous. "Virtualize Your Conference." Printed Apr. 22, 2021. 5 pages. Published by Open Exchange. https://www.openexc.com/virtualize-my-conference/?gclid=Cj0KCQiAst2BBhDJARIsAGo2IdX2XPjvYfTDG4atlril2jfltOsOOQNU5uBLHrJSudILcBWB02qp_iYaAnS0EALw_wcB.

Anonymous. "Virtual Reality Market with COVID-19 Impact Analysis by Offering (Hardware and Software), Technology, Device Type (Head-Mounted Display, Gesture-Tracking Device), Application (Consumer, Commercial, Enterprise, Healthcare) and Geography—Global Forecast to 2025." Printed Apr. 22, 2021. 12 pages. Published by Markets and Markets. https://www.marketsandmarkets.com/Market-Reports/reality-applications-market-458.html.

Greene, "IBM and Unity are teaming up to bring Watson's AI to VR and AR games." Published Feb. 20, 2018. 5 pages. Published by TNW News. https://thenextweb.com/news/ibm-and-unity-are-teaming-up-to-bring-watsons-ai-to-vr-and-ar-games.

Mell, et al., "The NIST Definition of Cloud Computing," Recommendations of the National Institute of Standards and Technology, U.S. Department of Commerce, Special Publication 800-145, Sep. 2011, 7 pgs.

Satell, "IBM's Patent Leadership Tells You a Lot About Its Strategy." Published Jan. 10, 2017. 10 pages. Published by Inc. https://www.inc.com/greg-satell/ibms-patent-leadership-tells-you-a-lot-about-its-strategy.html.

* cited by examiner

VIRTUAL SYSTEM FOR MERGING AND SPLITTING VIRTUAL MEETINGS

BACKGROUND

The present disclosure relates generally to the field of remote conference meetings, and more particularly to the field of virtual reality (VR).

The development of VR related technology has changed how people interact with their environment. As this technology has grown in popularity, so too has demand to make VR more available for daily use. While many VR applications are associated with entertainment (e.g., video games), VR technology has been adopted across industries to address various business needs.

SUMMARY

Embodiments of the present disclosure include a method, computer program product, and system for enhancing user experience during virtual reality (VR) meetings. A processor may generate a first VR environment of the VR meeting having a plurality of users. In embodiments, the plurality of users may opt into the VR meeting. A processor may analyze meeting activity collected from one or more data collection devices. In embodiments, the meeting activity may be associated with the plurality of users. A processor may identify a meeting modifier in the meeting activity. A processor may alter, responsive to identifying a meeting modifier in the meeting activity, the first VR environment of the VR meeting to generate a second VR environment.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
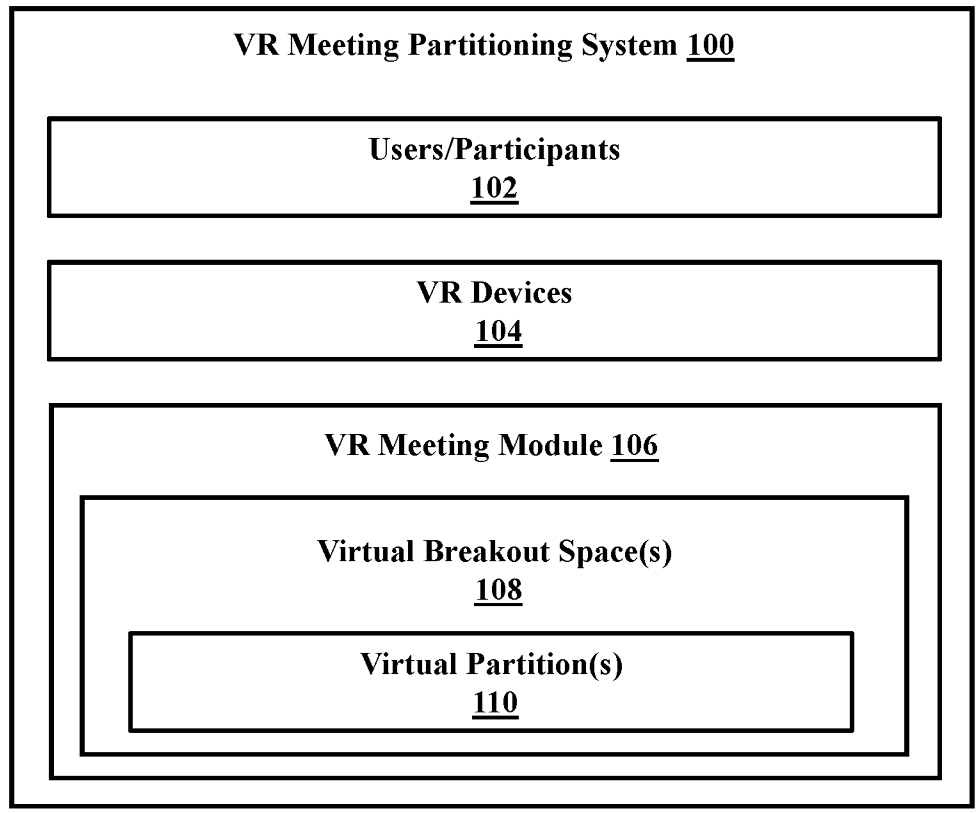
FIG. 1 depicts a block diagram of an embodiment of a virtual reality (VR) meeting system, in accordance with the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of remote conference meetings, and more particularly to the field of virtual reality (VR). While the present disclosure is not necessarily limited to such applications, various aspects of the disclosure may be appreciated through a discussion of several examples using this context.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application and to enable others of ordinary skill in the art to understand the disclosure for various embodiments with various modifications as are suited to the particular use contemplated.

Aspects of the present disclosure relate generally to the field of remote conference meetings, and more particularly to VR systems and virtual environments associated with using VR to conduct various meetings (e.g., conference meetings). While the present disclosure is not necessarily limited to such applications, various aspects of the disclosure may be appreciated through a discussion of several examples using this context.

Due to the adaptability and inherent usefulness of VR, various industries and businesses are discovering how VR may be used to benefit and solve problems within their respective industries. In recent years, businesses have utilized VR to transform the traditional conference meeting format. These conventional VR meeting systems not only allow people in the same room to interact in a virtual space, but may also allow other parties remotely located (e.g., in an adjacent room or separate country) to interact and communicate in the same virtual space. While these conventional VR meeting systems enable people to virtually interact, such systems have been found to lack utility, particularly when it comes to generating a usable virtual space for a large group of people (e.g., a work conference meeting, family gathering, etc.). As such, processes and systems associated with enhancing user experience in a VR meeting is desired. By enhancing user experiences in virtual spaces can result in an increase in meeting productivity and reduce time delays associated with organizing users within the virtual space of the VR meeting.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

It will be readily understood that the instant components, as generally described and illustrated in the figures herein, may be arranged and designed in a wide variety of different configurations. Accordingly, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined or removed in any suitable manner in one or more embodiments. For example, the usage of the phrases "example embodiments," "some embodiments," or other similar language, throughout this specification refers to the fact that a particular feature, structure, or characteristic described in connection with the embodiment may be included in at least one embodiment. Accordingly, appearances of the phrases "example embodiments," "in some embodiments," "in other embodiments," or other similar language, throughout this specification do not necessarily all refer to the same group of embodiments, and the described features, structures, or characteristics may be combined or removed in any suitable manner in one or more embodiments. Further, in the FIGS., any connection between elements can permit one-way and/or two-way communication even if the depicted connection is a one-way or two-way arrow.

In embodiments discussed herein, are solutions provided in the form of a method, system, and computer program product for enhancing user experience in a VR meeting space. Embodiments contemplated herein enable a group of people to interact with and experience a VR meeting environment configured to meet their meeting needs (e.g., the need for discussion between small groups of people) and to dynamically change the virtual space/environment based, at least in part, on those meeting needs. In embodiments, the VR meeting system may be configured to provide a virtual space for any number of users/participants.

In some embodiments, users/participants may each have their own VR device(s) enabling them to interact in the virtual space of the VR meeting. These VR devices, such as a VR headset or VR room, may include any number of equipment/components necessary to generate the simulated virtual space of the VR meeting. These components may include, but are not limited to, sound generating components, airflow generating components, temperature generating components, and any other components that may be necessary for generating/simulating the desired virtual space. While embodiments referenced herein may refer to a VR headset, any VR configuration (e.g., VR room) may also be used.

As referenced herein, a processor may be configured to generate a VR meeting for any number of users/participants. These users/participants participating in the VR meeting may be comprised of one or more different group configurations. For example, these different group configurations may include, but are not limited to, users/participants located in the same room, a single user/participant located in a separate area from other users/participants, users/participants located in groups of at least two in different remote locations, or any combination thereof.

In some embodiments, a VR meeting may be comprised of users/participants who are each located in a different location. For example, in these embodiments, each user/participant may be working from their respective homes and use the VR meeting space to conduct work meetings. In some embodiments, a VR meeting may be comprised of users/participants who are all located within the same room. For example, in these embodiments, the users/participants may all be located in a conference room or conference hall and may be interacting with the virtual space of the VR meeting using individual VR headsets. In some embodiments, a VR meeting may be comprised of groups of users/participants remotely located from each other. For example, in these embodiments, each person within the group may interact with the virtual space with a VR headset and the virtual space of the VR meeting would allow each person (e.g., users/participants) to interact as if they were in the same conference room.

In embodiments, a VR meeting may include one or more of these different group configurations. For example, an employer could schedule a VR meeting to discuss an upcoming work project. In this example, some employees may be located at the worksite and may participate in the VR meeting together in a conference room. The conference room or conference hall may be configured as a VR room or each employee may use a VR headset. Other employees may be traveling together as a group while working on a different work project and may be located in another country and may join the meeting using VR headsets. Continuing this example, some employees may have been granted work from home privileges and, though separately located from other employees, may use a VR headset to join the VR meeting.

While in many situations a large number of users/participants participating in the virtual space of the VR meeting may be beneficial, in other situations, it may be more useful to split the number of users/participants into smaller groups. For example, breakout groups have recently increased in popularity as a technique to increase participation and discussion among a large group of people by breaking up the large group of people discussion into smaller breakout groups. Unfortunately, conventional VR meeting systems have traditionally not only required a facilitator to assign employees to a breakout group, but often also require the initial VR meeting to end and each breakout group to initiate their own independent VR meeting. In addition, once discussion has been completed within the VR meeting of the breakout group and the users/participants wish to reunite with the other breakout groups, using conventional VR meeting systems each breakout group VR meeting must first be ended before joining a new VR meeting with all of the users/participants in the same virtual space. As such, embodiments contemplated herein enhance a user experience by allowing for dynamic splitting of users/participants interacting in the virtual space of a VR meeting into small virtual meeting spaces (e.g., virtual breakout rooms) and/or dynamically merging the small virtual meeting spaces into the initial virtual space of the VR meeting.

In embodiments, a processor may be configured to receive or collect meeting activity. Meeting activity may include data/information associated with users/participants who intend to interact with the virtual space of the VR meeting from one or more data collection devices. The one or more data collection devices may include, but are not limited to, cameras, video devices, Internet of Things (IoT) devices, and/or any other device or component needed to implement the VR meeting system contemplated herein. While in some embodiments, one or more data collection devices may be configured within a VR device (e.g., VR headset or VR room), in other embodiments, the one or more data collection devices may be configured within the physical environment of the users/participants.

In embodiments, a processor may use the information received by the one or more data collection devices and determine if each of the users/participants has opted into the VR meeting. In embodiments, where a processor determines a user/participant has not opted into the VR meeting the user/participant will not be granted access to the virtual space of the VR meeting. In some embodiments, a processor may have access to a user profile for each of the users/participants who have opted-in to the VR meeting. In embodiments, a user profile may contain information associated with the users/participants opt-in status. In these embodiments, a processor may access information in the user profile (e.g., using facial or voice recognition technology) and compare the user profile information with the data/information received from the one or more data collection devices to confirm the user's/participant's identity. In some embodiments, a user profile may include a user's/participant's preferred avatar that will represent the user/participant in the virtual space of the VR meeting.

In embodiments, a processor may be configured to generate a first VR environment of the VR meeting (e.g., within a VR meeting system) having a plurality of users/participants (e.g., those users/participants who have opted into the VR meeting). In some embodiments, the first VR environment of the VR meeting may allow each of the users/participants who have joined the VR meeting to virtually interact with each other. In these embodiments, each of the users/participants who have joined the VR meeting in the first VR environment, whether located within the same room as other users/participants or those users/participants who are remotely located, may be able to view each of the other users'/participants' avatars in the generated virtual space. In addition, in some embodiments, each of the users/participants may virtually interact with other users/participants by virtually moving throughout the virtual space and communicating with other users'/participants' avatars. For example, a user might virtually see a colleague's avatar and virtually move closer to the colleague's avatar to greet them. In these embodiments, this virtual movement of one user/participant may be viewed and/or heard by other users/participants in the first VR environment.

In embodiments, a processor may analyze meeting activity collected from the first VR environment and/or one or more data collection devices. In embodiments, the meeting activity may be based, at least in part, on with the physical environment each of the plurality of users/participants occupy. This meeting activity may include, but is not limited to, information associated with users/participants are in the same physical vicinity, information associated with users/participants are in the same virtual vicinity, the identities of users/participants, the number of users/participants who have entered the first VR environment, one or more communications spoken between one or more of the plurality of users/participants, or any combination thereof.

In embodiments, a processor may identify a meeting modifier in the meeting activity. A meeting modifier may include any action within the meeting activity that is indicative that the first VR environment of the VR meeting should be altered (e.g., to a second VR environment). While in some embodiments, a meeting modifier may include an instruction from an administrator of the VR meeting to the VR system that the first VR environment should be altered, in other embodiments a meeting indicator may include an action directly associated with the VR meeting activity. For example, a processor may analyze the meeting activity and identify that all of the users/participants expected to join the VR meeting have joined. In response to the processor identifying that all of the users/participants have joined the processor may alter the first VR environment (e.g., from a waiting room encouraging conversation to a more formal meeting environment). In another example, a processor may receive an instruction from an employer (e.g., an administrator) holding a business meeting within the VR meeting. In this example, the employer may instruct the VR meeting system that a different VR environment is needed. In other embodiments, a processor may be configured to use AI capabilities to detect and analyze prior meeting activity and identify actions (e.g., verbal cues among users/participant) that are indicative that the first VR environment should be altered. In these embodiments, a processor may determine that these actions are meeting modifiers. In these embodiments, when a processor observes this identified meeting modifier within current meeting activity, a processor may automatically alter the first VR environment. In embodiments, a processor may alter the first VR environment to a second VR environment, responsive to identifying a meeting modifier.

In embodiments, a processor may alter the first VR environment and generate a second VR environment. In some embodiments, a processor may alter the first VR environment and generate the second VR environment by activating one or more virtual partitions in the virtual space of the VR meeting. The activation of one or more virtual partitions (e.g., to form a second VR environment) may allow users/participants occupying the virtual space of the VR meeting to be separated or sorted into smaller parties. In embodiments, each party may occupy a different virtual breakout space within the VR meeting's virtual space. In one example embodiment, a virtual partition may be activated to virtually separate a large group of users/participants into a first party from a second party. In these embodiments, by generating a virtual partition, a processor may virtually create a virtual breakout space for the first party and a separate virtual breakout space for the second party. While embodiments discussed herein often refer to two parties (e.g., first party and second party), such embodiments are for brevity and clarity only. Such embodiments should not be considered limiting as any number of virtual partitions may be generated to separate any number of different parties into their respective corresponding virtual breakout spaces.

In embodiments, the virtual breakout space may be configured to function similarly to traditional physical breakout rooms and provide the plurality of users/participants the utility of private small group discussion without interference from other users/participants who have been separated into other virtual breakout spaces. The virtual breakout spaces may allow the users/participants that have been sorted into that particular virtual breakout space to virtually interact with each other. For example, users/participants within a particular virtual breakout space may communicate and virtually move closer or away from each other. Virtual breakout spaces may also prevent activity associated with other groups in other virtual breakout spaces from interfering with the group's interactions (e.g., discussion of a particular topic).

In embodiments, a first VR environment of a VR meeting may include one or more already activated virtual partitions separating the plurality of users/participants into at least a first party and a second party. In one example embodiment, a business may have multiple office locations that will be participating in a single VR meeting. In this example embodiment, each user/participant, upon joining the VR meeting, may be immediately sorted in a separate virtual breakout space based on which office location the user/participant works at. As in other embodiments contemplated herein, a processor may detect a meeting modifier within the meeting activity. In some embodiments, a processor may alter the first VR environment, having one or more virtual partitions that separate the users/participants into virtual breakout spaces, to a second VR environment. In these embodiments, a processor may alter the second VR environment by removing the virtual partitions from the VR meeting. By removing the virtual partitions, a processor may reconfigure the VR meeting to merger the one or more virtual breakout spaces into a virtual space with all of the users/participants.

In some embodiments, a processor may be configured to receive input from an administrator regarding how the plurality of users/participants should be split into different virtual breakout spaces. For example, a VR meeting administrator may assign a user/participant to a team or party. In these embodiments, when the virtual partitions are activated, each user/participant will be sorted into the particular party associated with the virtual breakout space the administrator assigned them to. In some embodiments, a processor may sort or split the plurality of users/participants into different groups for a virtual breakout space based on the relative physical position of each user/participant compared to other user positions. For example, users/participants who are physically near each other when compared to other users/participants may be sorted into the same party and corresponding virtual breakout space. In some embodiments, a processor may sort or split the plurality of users/participants into different virtual breakout spaces based on each of the users relative position to other users/participants in the VR meeting's virtual space. For example, in some embodiments, users/participants may virtually move throughout the VR meeting virtual space. In these embodiments, some users who virtually move may virtually appear closer to some users who are physically separated by large distances. In such embodiments, users/participants who are virtually near each other may be sorted into the same party and corresponding virtual breakout space.

In some embodiments, a processor may configure the VR meeting virtual space to activate multiple virtual partitions to generate multiple virtual breakout spaces. In embodiments, a processor based, at least in part, on meeting activity and/or meeting modifiers, may merge some virtual breakout spaces (e.g., merging a first party and a second party) by deactivating some virtual partitions while maintaining other virtual breakout spaces (e.g., keeping a third party separate from the merged first and second party). In embodiments, where a processor has deactivated one or more virtual partitions and merged virtual breakout spaces, a processor may configure the merged virtual breakout spaces to allow the now merged party of users/participants to communicate and share information.

In embodiments, a processor may allow for users/participants to dynamically move between virtual breakout spaces. In one example embodiment, a first party could be assigned to Virtual Breakout Space A to discuss Topic 1 and a second party could be assigned to Virtual Breakout Space B to discuss Topic 2. In this example embodiment, some users/participants of the first party may leave Virtual Breakout Space A after discussing Topic 1 and join Virtual Breakout Space B to listen to the second party discuss Topic 2. In embodiments, a processor may generate a virtual overview that may be visible to users/participants who are exiting one virtual breakout space and entering a different virtual breakout space. In these embodiments, a virtual overview may include, but is not limited to, an identifier for each virtual breakout space (e.g., name, topic of discussion, etc.) and/or the names of each user/participant in a particular virtual breakout space. In some embodiments, a processor may collect party statistics (e.g., using one or more data collection devices). In these embodiments, a processor may identify the party size, number of users/participants within each virtual breakout space, and other information associated the plurality of users/participants in the VR meeting virtual space (e.g., meeting activity). In some embodiments, a processor may analyze the various statistical information to identify how the users/participants should be sorted into different parties and assigned to particular virtual breakout spaces.

In some embodiments, a processor may allow a late user/participant to join a VR meeting after the VR meeting has already started. In these embodiments, where the VR space has already activated the virtual partitions and configured the virtual breakout rooms (e.g., separated the users/participants into different parties) a processor may provide the late user/participant access to the virtual overview of the VR meeting, having the name of the virtual breakout space (e.g., identifier), topic of discussion, and the name of each user/participant already assigned to each particular virtual breakout space. While in some embodiments, a processor may provide the late user/participant the option to choose which virtual breakout space they want to join, in other embodiments, a processor may automatically sort the late user/participant into a particular virtual breakout space. For example, in some embodiment, a processor may assign a late user/participant to a party that has fewer users/participants in an assigned virtual breakout space compared to the other virtual breakout spaces to ensure some virtual breakout spaces are not disparately populated when compared to others virtual breakout spaces.

Referring now to FIG. 1, a block diagram of a VR meeting system 100, is depicted in accordance with embodiments of the present disclosure. FIG. 1 provides an illustration of only one implementation and does not imply any limitations with regard to the environments in which different embodiments may be implemented. Many modifications to the depicted environment may be made by those skilled in the art without departing from the scope of the invention as recited by the claims.

In embodiments, VR meeting partitioning system 100 may include users/participants 102, VR devices 104, and VR meeting module 106. In embodiments, VR meeting partitioning system 100 may configure VR devices 104 to provide a VR meeting for the plurality of users/participants 104 using VR meeting module 106. In these embodiments, VR meeting module 106 may generate a first VR environment of the VR meeting having a plurality of users/participants. In embodiments, VR meeting partitioning system 100 may analyze meeting activity collected from one or more data collection devices. In these embodiments, the meeting activity may include information and data associated with the plurality of users/participants. In embodiments VR meeting module 106 may be configured to identify a meeting modifier from the meeting activity. In some embodiments, VR meeting module 106 may generate virtual breakout spaces 108. In these embodiments, VR meeting module 106 may activate one or more virtual partitions to generate the virtual breakout spaces 108. In embodiments, responsive to identifying a meeting modifier from the meeting activity, VR meeting module 106 may alter the first VR environment of the VR meeting to generate a second VR environment. In embodiments, VR meeting module 106 may alter the first VR environment by activating and/or deactivating one or more virtual partition(s) 110 within the virtual meeting. When virtual partitions 110 are activated and deactivated, virtual breakout spaces having different groups or parties associated with each different virtual breakout space may be split and merged, respectively.

Figure 2:
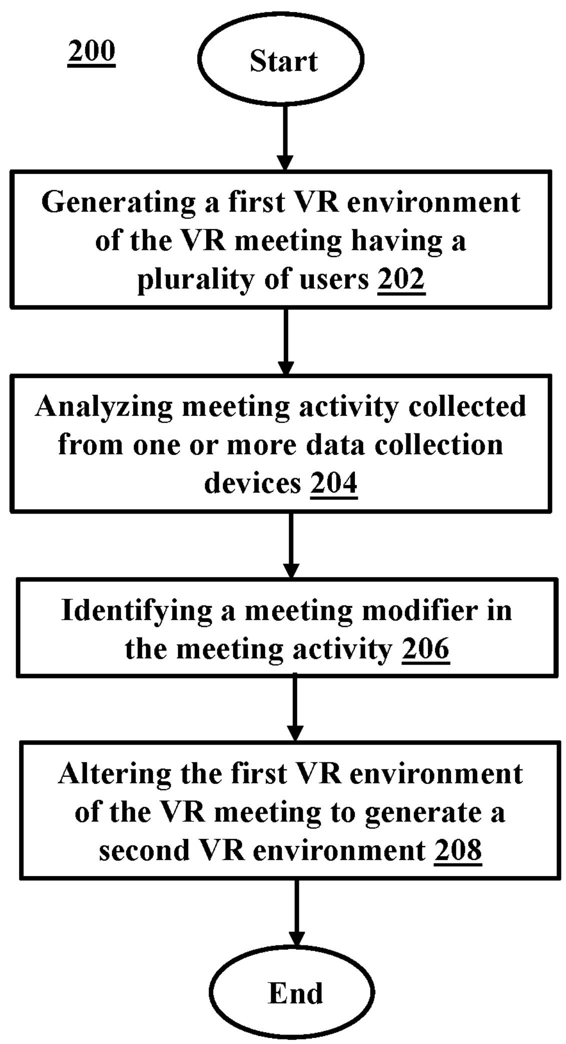
FIG. 2 illustrates a flowchart of a method for enhancing user experience during a VR meeting, in accordance with embodiments of the present disclosure.

Referring now to FIG. 2, a flowchart illustrating an example method 200 for splitting and/or merging virtual breakout spaces, in accordance with embodiments of the present disclosure. In some embodiments, the method 200 begins at operation 202 where a processor a generates a first VR environment of the VR meeting having a plurality of users. In some embodiments, the plurality of users may opt into the VR meeting.

In some embodiments, the method 200 proceeds to operation 204. At operation 204, a processor may analyze meeting activity collected from one or more data collection devices. In these embodiments, the meeting activity may be associated with the plurality of users.

In some embodiments, the method 200 proceeds to operation 206. At operation 206, a processor may identify a meeting modifier in the meeting activity.

In some embodiments, the method 200 proceeds to operation 208. At operation 208, the processor may alter the first VR environment of the VR meeting to generate a second VR environment. In some embodiments, as depicted in FIG. 2, after operation 208, the method 200 may end.

As discussed in more detail herein, it is contemplated that some or all of the operations of the method 200 may be performed in alternative orders or may not be performed at all; furthermore, multiple operations may occur at the same time or as an internal part of a larger process.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of portion independence in that the consumer generally has no control or knowledge over the exact portion of the provided resources but may be able to specify portion at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3A:
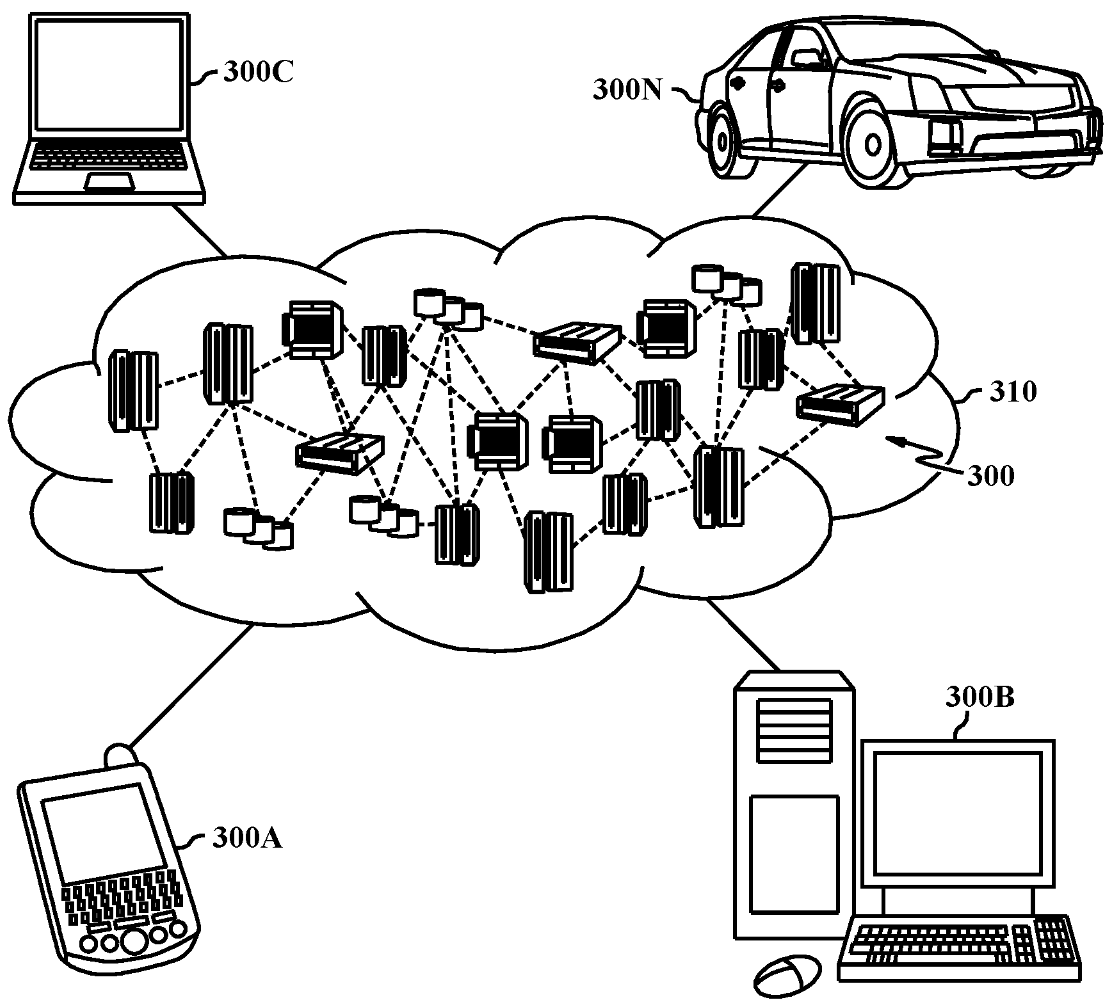
FIG. 3A illustrates a cloud computing environment, in accordance with embodiments of the present disclosure.

Referring now to FIG. 3A, illustrative cloud computing environment 310 is depicted. As shown, cloud computing environment 310 includes one or more cloud computing nodes 300 with which local computing devices used by cloud consumers, such as, for example, personal digital assistant (PDA) or cellular telephone 300A, desktop computer 300B, laptop computer 300C, and/or automobile computer system 300N may communicate. Nodes 300 may communicate with one another. They may be grouped (not shown) physically or virtually, in one or more networks, such as Private, Community, Public, or Hybrid clouds as described hereinabove, or a combination thereof. This allows cloud computing environment 310 to offer infrastructure, platforms and/or software as services for which a cloud consumer does not need to maintain resources on a local computing device. It is understood that the types of computing devices 300A-N shown in FIG. 3A are intended to be illustrative only and that computing nodes 300 and cloud computing 300 and cloud computing environment 310 can communicate with any type of computerized device over any type of network and/or network addressable connection (e.g., using a web browser).

Figure 3B:
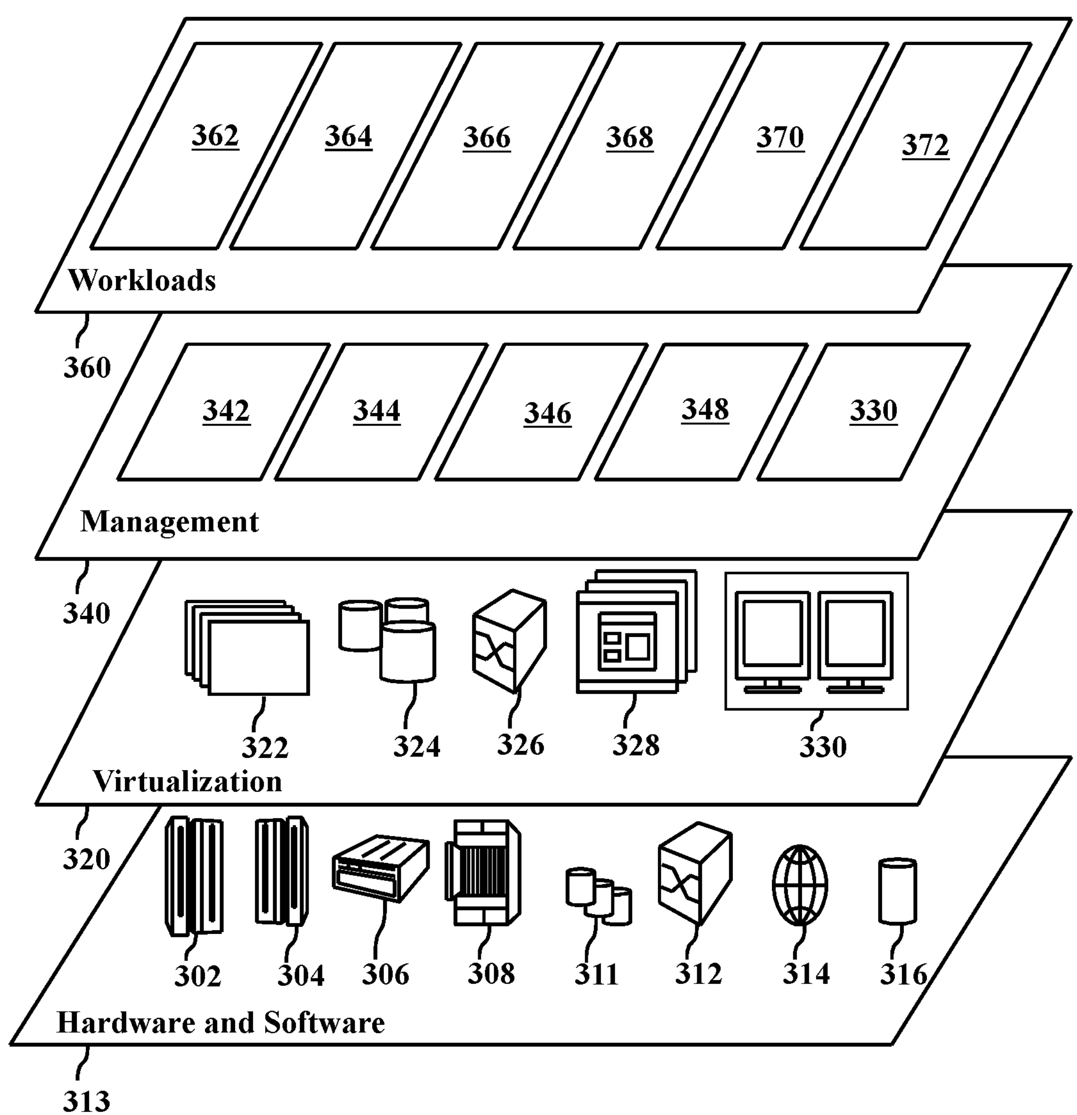
FIG. 3B illustrates abstraction model layers, in accordance with embodiments of the present disclosure.

Referring now to FIG. 3B, a set of functional abstraction layers provided by cloud computing environment 310 (FIG. 3A) is shown. It should be understood in advance that the components, layers, and functions shown in FIG. 3B are intended to be illustrative only and embodiments of the disclosure are not limited thereto. As depicted below, the following layers and corresponding functions are provided.

Hardware and software layer 315 includes hardware and software components. Examples of hardware components include: mainframes 302; RISC (Reduced Instruction Set Computer) architecture based servers 304; servers 306; blade servers 308; storage devices 311; and networks and networking components 312. In some embodiments, software components include network application server software 314 and database software 316.

Virtualization layer 320 provides an abstraction layer from which the following examples of virtual entities may be provided: virtual servers 322; virtual storage 324; virtual networks 326, including virtual private networks; virtual applications and operating systems 328; and virtual clients 330.

In one example, management layer 340 may provide the functions described below. Resource provisioning 342 provides dynamic procurement of computing resources and other resources that are utilized to perform tasks within the cloud computing environment. Metering and Pricing 344 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 346 provides access to the cloud computing environment for consumers and system administrators. Service level management 348 provides cloud computing resource allocation and management such that required service levels are met. Service Level Agreement (SLA) planning and fulfillment 350 provide pre-arrangement for, and procurement of, cloud computing resources for which a future requirement is anticipated in accordance with an SLA.

Workloads layer 360 provides examples of functionality for which the cloud computing environment may be utilized. Examples of workloads and functions which may be provided from this layer include: mapping and navigation 362; software development and lifecycle management 364; virtual classroom education delivery 366; data analytics processing 368; transaction processing 370; and proactive building managing 372.

Figure 4:
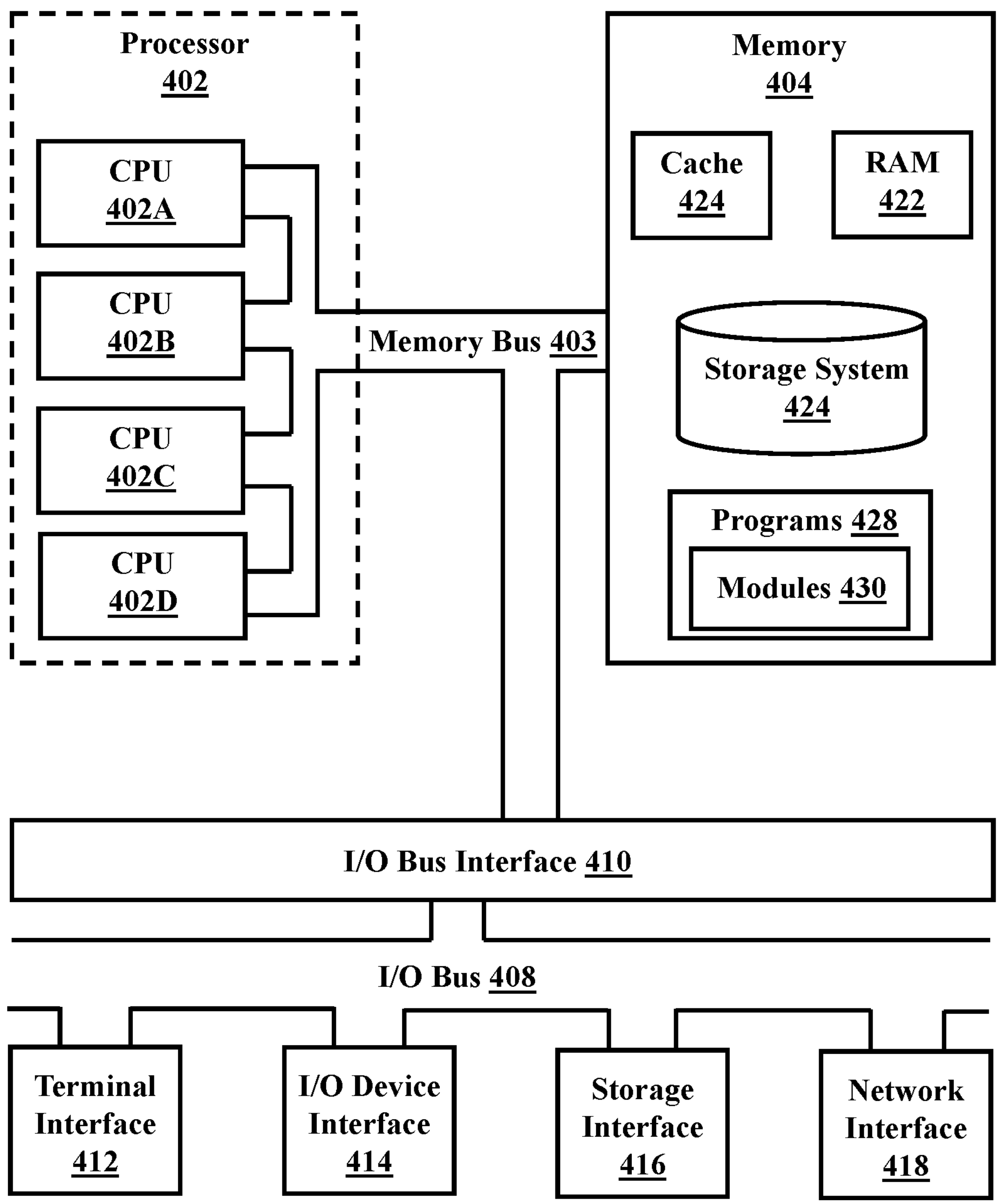
FIG. 4 illustrates a high-level block diagram of an example computer system that may be used in implementing one or more of the methods, tools, and modules, and any related functions, described herein, in accordance with embodiments of the present disclosure.

FIG. 4, illustrated is a high-level block diagram of an example computer system 401 that may be used in implementing one or more of the methods, tools, and modules, and any related functions, described herein (e.g., using one or more processor circuits or computer processors of the computer), in accordance with embodiments of the present invention. In some embodiments, the major components of the computer system 401 may comprise one or more Processor 402, a memory subsystem 404, a terminal interface 412, a storage interface 416, an I/O (Input/Output) device interface 414, and a network interface 418, all of which may be communicatively coupled, directly or indirectly, for inter-component communication via a memory bus 403, an I/O bus 408, and an I/O bus interface unit 410.

The computer system 401 may contain one or more general-purpose programmable central processing units (CPUs) 402A, 402B, 402C, and 402D, herein generically referred to as the CPU 402. In some embodiments, the computer system 401 may contain multiple processors typical of a relatively large system; however, in other embodiments the computer system 401 may alternatively be a single CPU system. Each CPU 402 may execute instructions stored in the memory subsystem 404 and may include one or more levels of on-board cache.

System memory 404 may include computer system readable media in the form of volatile memory, such as random access memory (RAM) 422 or cache memory 424. Computer system 401 may further include other removable/non-removable, volatile/non-volatile computer system storage media. By way of example only, storage system 426 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 404 can include flash memory, e.g., a flash memory stick drive or a flash drive. Memory devices can be connected to memory bus 403 by one or more data media interfaces. The memory 404 may include at least one program product having a set (e.g., at least one) of program modules that are configured to carry out the functions of various embodiments.

One or more programs/utilities 428, each having at least one set of program modules 430 may be stored in memory 404. The programs/utilities 428 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 428 and/or program modules 430 generally perform the functions or methodologies of various embodiments.

Although the memory bus 403 is shown in FIG. 4 as a single bus structure providing a direct communication path among the CPUs 402, the memory subsystem 404, and the I/O bus interface 410, the memory bus 403 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 410 and the I/O bus 408 are shown as single respective units, the computer system 401 may, in some embodiments, contain multiple I/O bus interface units 410, multiple I/O buses 408, or both. Further, while multiple I/O interface units are shown, which separate the I/O bus 408 from various communications paths running to the various I/O devices, in other embodiments some or all of the I/O devices may be connected directly to one or more system I/O buses.

In some embodiments, the computer system 401 may be a multi-user mainframe computer system, a single-user system, or a server computer or similar device that has little or no direct user interface, but receives requests from other computer systems (clients). Further, in some embodiments, the computer system 401 may be implemented as a desktop computer, portable computer, laptop or notebook computer, tablet computer, pocket computer, telephone, smartphone, network switches or routers, or any other appropriate type of electronic device.

It is noted that FIG. 4 is intended to depict the representative major components of an exemplary computer system 401. In some embodiments, however, individual components may have greater or lesser complexity than as represented in FIG. 4, components other than or in addition to those shown in FIG. 4 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A computer-implemented method, the method comprising:

generating a first virtual reality (VR) environment of the VR meeting having a plurality of users, wherein the plurality of users are participating in a VR meeting;

analyzing meeting activity collected from one or more data collection devices, wherein the meeting activity is associated with the plurality of users during the VR meeting;

identifying a meeting modifier in the meeting activity by utilizing artificial intelligence (AI) capabilities to detect and analyze prior meeting activity and identify actions that are indicative that the first VR environment should be altered, wherein the meeting modifier is based on the actions comprising verbal cues among the plurality of users during the VR meeting; and altering, responsive to identifying the meeting modifier in the meeting activity, the first VR environment of the VR meeting to generate a second VR environment; and generating a virtual overview of the VR meeting identifying the first VR environment and the second VR environment to each of the plurality of users.

2. The method of claim 1, wherein generating the first VR environment further includes:

activating a virtual partition between a first party and a second party, wherein the virtual partition virtually separates the first party and the second party.

3. The method of claim 2, wherein altering the first VR environment of the VR meeting to generate the second VR environment further includes:

merging the first party and the second party to generate the second VR environment, wherein merging the first party and the second party removes the virtual partition and allows the first party and the second party to interact.

4. The method of claim 1, wherein generating the first VR environment further includes:

deactivating a virtual partition between the first party and the second party, wherein deactivating the virtual partition virtually merging the first party and the second party, wherein the first party and second party are allowed to interact.

5. The method of claim 4, wherein altering the first VR environment of the VR meeting to generate the second VR environment further includes:

activating a virtual partition between the first party and the second party to generate the second VR environment, wherein the virtual partition virtually separates the first party and the second party.

6. The method of claim 5, further including:

identifying a late user with the one or more data collection devices;

generating a virtual overview of the VR meeting; and offering the late user an option to join the first party or the second party.

7. The method of claim 1, wherein altering the first VR environment of the VR meeting to generate the second VR environment includes:

analyzing the meeting activity;

determining virtual movements of each user of the plurality of users in the VR meeting; and activating one or more virtual partitions between one or more users of the plurality of users, based on the virtual movement of each user of the plurality of users.

8. The method of claim 1, wherein the first VR environment of the VR meeting to generate the second VR environment includes:

analyzing the meeting activity;

determining a relative physical position of each of the plurality of users; and activating one or more virtual partitions between one or more users of the plurality of users, based on the relative position of each user of the plurality of users.

9. A system, the system comprising:

a memory; and a processor in communication with the memory, the processor being configured to perform operations comprising:

generating a first virtual reality (VR) environment of the VR meeting having a plurality of users, wherein the plurality of users are participating in a VR meeting;

analyzing meeting activity collected from one or more data collection devices, wherein the meeting activity is associated with the plurality of users during the VR meeting;

identifying a meeting modifier in the meeting activity by utilizing artificial intelligence (AI) capabilities to detect and analyze prior meeting activity and identify actions that are indicative that the first VR environment should be altered, wherein the meeting modifier is based on the actions comprising verbal cues among the plurality of users during the VR meeting;

altering, responsive to identifying the meeting modifier in the meeting activity, the first VR environment of the VR meeting to generate a second VR environment; and generating a virtual overview of the VR meeting identifying the first VR environment and the second VR environment to each of the plurality of users.

10. The system of claim 9, wherein generating the first VR environment further includes:

activating a virtual partition between a first party and a second party, wherein the virtual partition virtually separates the first party and the second party.

11. The system of claim 10, wherein altering the first VR environment of the VR meeting to generate the second VR environment further includes:

merging the first party and the second party to generate the second VR environment, wherein merging the first party and the second party removes the virtual partition and allows the first party and the second party to interact.

12. The system of claim 9, wherein generating the first VR environment further includes:

deactivating a virtual partition between the first party and the second party, wherein deactivating the virtual partition virtually merging the first party and the second party, wherein the first party and second party are allowed to interact.

13. The system of claim 12, wherein altering the first VR environment of the VR meeting to generate the second VR environment further includes:

activating a virtual partition between the first party and the second party to generate the second VR environment, wherein the virtual partition virtually separates the first party and the second party.

14. The system of claim 13, further including:

identifying a late user with the one or more data collection devices;

generating a virtual overview of the VR meeting; and offering the late user an option to join the first party or the second party.

15. A computer program product, the computer program product comprising a computer readable storage medium having program instructions embodied therewith, the program instructions executable by a processor to cause the processors to perform a function, the function comprising:

generating a first virtual reality (VR) environment of the VR meeting having a plurality of users, wherein the plurality of users are participating in a VR meeting;

analyzing meeting activity collected from one or more data collection devices, wherein the meeting activity is associated with the plurality of users during the VR meeting;

identifying a meeting modifier in the meeting activity by utilizing artificial intelligence (AI) capabilities to detect and analyze prior meeting activity and identify actions that are indicative that the first VR environment should be altered, wherein the meeting modifier is based on the actions comprising verbal cues among the plurality of users during the VR meeting;

altering, responsive to identifying the meeting modifier in the meeting activity, the first VR environment of the VR meeting to generate a second VR environment; and generating a virtual overview of the VR meeting identifying the first VR environment and the second VR environment to each of the plurality of users.

16. The computer program product of claim 15, wherein generating the first VR environment further includes:

activating a virtual partition between a first party and a second party, wherein the virtual partition virtually separates the first party and the second party.

17. The computer program product of claim 16, wherein altering the first VR environment of the VR meeting to generate the second VR environment further includes:

merging the first party and the second party to generate the second VR environment, wherein merging the first party and the second party removes the virtual partition and allows the first party and the second party to interact.

18. The computer program product of claim 15, wherein generating the first VR environment further includes:

deactivating a virtual partition between the first party and the second party, wherein deactivating the virtual partition virtually merging the first party and the second party, wherein the first party and second party are allowed to interact.

19. The computer program product of claim 18, wherein altering the first VR environment of the VR meeting to generate the second VR environment further includes:

activating a virtual partition between the first party and the second party to generate the second VR environment, wherein the virtual partition virtually separates the first party and the second party.

20. The computer program product of claim 19, further including:

identifying a late user with the one or more data collection devices;

generating a virtual overview of the VR meeting; and offering the late user an option to join the first party or the second party.

* * * * *